US011505025B2

(12) United States Patent
Kang

(10) Patent No.: US 11,505,025 B2
(45) Date of Patent: Nov. 22, 2022

(54) DEVICE AND METHOD FOR DETERMINING MASS OF VEHICLE

(71) Applicants: HYUNDAI MOTOR COMPANY, Seoul (KR); KIA MOTORS CORPORATION, Seoul (KR)

(72) Inventor: Sheen Gil Kang, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 329 days.

(21) Appl. No.: 16/998,566

(22) Filed: Aug. 20, 2020

(65) Prior Publication Data

US 2021/0379951 A1 Dec. 9, 2021

(30) Foreign Application Priority Data

Jun. 3, 2020 (KR) .................. 10-2020-0067235

(51) Int. Cl.
*B60W 40/08* (2012.01)
*B60G 17/017* (2006.01)

(52) U.S. Cl.
CPC .......... *B60G 17/017* (2013.01); *B60W 40/08* (2013.01); *B60G 2400/252* (2013.01); *B60G 2400/62* (2013.01); *B60G 2500/20* (2013.01); *B60W 2540/049* (2020.02)

(58) Field of Classification Search
CPC ............ B60W 2540/049; B60W 40/08; B60G 17/017; B60G 2400/252; B60G 2400/62; B60G 2500/20
USPC .......................................................... 701/37
See application file for complete search history.

(56) References Cited

U.S. PATENT DOCUMENTS

| 6,293,562 B1* | 9/2001 | Kutscher | B60G 17/016 |
| | | | 280/5.514 |
| 10,875,496 B2* | 12/2020 | Herman | B60R 25/01 |
| 2007/0295065 A1* | 12/2007 | Nordmeyer | B60G 11/15 |
| | | | 73/117.03 |
| 2014/0316637 A1* | 10/2014 | Rhode | B60G 17/0182 |
| | | | 701/29.1 |
| 2019/0255903 A1* | 8/2019 | Hirao | B60G 17/018 |
| 2020/0023811 A1* | 1/2020 | Herman | G01G 19/414 |

(Continued)

FOREIGN PATENT DOCUMENTS

KR 10-2018-0104840 A 9/2018

*Primary Examiner* — Toan C To
(74) *Attorney, Agent, or Firm* — Morgan, Lewis & Bockius LLP

(57) ABSTRACT

A device for determining a mass of a vehicle includes vehicle height sensors respectively mounted on left front and rear wheels or respectively mounted on right front and rear wheels to sense a vehicle height of the vehicle, a passenger detecting sensor for sensing the number of passengers boarded the vehicle and boarded locations of the passengers, and a controller that calculates a load based on the vehicle height, calculates a load conversion factor based on each offset set based on a boarded location of each passenger and the number of passengers, and calculates a mass change amount based on the load and the load conversion factor. The device may determine an accurate mass of the vehicle when the vehicle height sensors are not mounted on all four wheels, improve a performance of the vehicle by reflecting the determined mass to vehicle control, and reduce tuning parameters for vehicle control.

19 Claims, 6 Drawing Sheets

(56) References Cited

U.S. PATENT DOCUMENTS

2021/0178849 A1* 6/2021 Park .................. B60G 17/0525
2022/0055436 A1* 2/2022 Kizu .................. B60G 17/019

* cited by examiner

DEVICE AND METHOD FOR DETERMINING MASS OF VEHICLE

CROSS-REFERENCE TO RELATED APPLICATION

This application claims the benefit of priority to Korean Patent Application No. 10-2020-0067235, filed in the Korean Intellectual Property Office on Jun. 3, 2020, the entire contents of which are incorporated herein by reference.

TECHNICAL FIELD

The present disclosure relates to a device and a method for determining a mass of a vehicle.

BACKGROUND

A mass of a vehicle is very important information for a chassis control system. For example, the chassis control system may include a tire pressure monitoring system (TPMS), an electronic stability control (ESC), an active roll stabilization (ARS), a continuous damping control (CDC), and the like.

Each load on each wheel may be calculated based on a stiffness of a spring of a suspension and a vehicle height change amount under assumption that a vehicle height sensor is mounted on each of all four wheels, and a ratio of gravitational acceleration to a total sum of the loads may be calculated as the mass of the vehicle. However, there is a limitation in that it is difficult to calculate an accurate mass of the vehicle because a case in which all of the four vehicle height sensors are not able to be used occurs. Therefore, a development of a technology capable of calculating the mass of the vehicle even when the vehicle height sensors are not respectively mounted on the four wheels is required.

SUMMARY

The present disclosure has been made to solve the above-mentioned problems occurring in the prior art while advantages achieved by the prior art are maintained intact.

An aspect of the present disclosure provides a device and a method for determining a mass of a vehicle that may calculate an accurate mass of the vehicle even when vehicle height sensors are not respectively mounted on all four wheels.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for determining a mass of a vehicle includes vehicle height sensors respectively mounted on a left front wheel and a left rear wheel or respectively mounted on a right front wheel and a right rear wheel to sense a vehicle height of the vehicle, a passenger detecting sensor for sensing the number of passengers boarded the vehicle and boarded locations of the passengers, and a controller that calculates a load based on the vehicle height, calculates a load conversion factor based on each offset set based on a boarded location of each passenger and the number of passengers, and calculates a mass change amount based on the load and the load conversion factor.

In one implementation, the controller may convert the vehicle height to a stroke value of a suspension.

In one implementation, the controller may calculate a load of a wheel equipped with the vehicle height sensor based on the stroke value and a stiffness of a spring of the suspension.

In one implementation, the controller may calculate the load conversion factor by dividing a product of the number of passengers boarded the vehicle and a distance between left and right wheels by a sum of the offsets set based on the boarded locations of the passengers whose boarding is sensed.

In one implementation, the controller may set the offset to 0 when the number of passengers boarded the vehicle is 0.

In one implementation, the controller may set a distance from the boarded location of the passenger to a wheel without the vehicle height sensor as the offset.

In one implementation, the controller may calculate the mass change amount by multiplying the load conversion factor by a value obtained by dividing the load by gravitational acceleration.

In one implementation, the controller may determine the mass of the vehicle as a sum of an initial mass of the vehicle and the mass change amount.

In one implementation, the controller may transmit the calculated mass change amount to a control system of the vehicle to control an operation of the vehicle.

According to an aspect of the present disclosure, a method for determining a mass of a vehicle includes obtaining a vehicle height of the vehicle sensed by vehicle height sensors respectively mounted on a left front wheel and a left rear wheel of the vehicle or respectively mounted on a right front wheel and a right rear wheel of the vehicle, sensing the number of passengers boarded the vehicle and boarded locations of the passengers, calculating a load based on the vehicle height, calculating a load conversion factor based on each offset set based on a boarded location of each passenger and the number of passengers, and calculating a mass change amount based on the load and the load conversion factor.

In one implementation, the method may further include, after the obtaining of the vehicle height, converting the vehicle height to a stroke value of a suspension.

In one implementation, the calculating of the load may include calculating a load of a wheel equipped with the vehicle height sensor based on the stroke value and a stiffness of a spring of the suspension.

In one implementation, the calculating of the load conversion factor may include calculating the load conversion factor by dividing a product of the number of passengers boarded the vehicle and a distance between left and right wheels by a sum of the offsets set based on the boarded locations of the passengers whose boarding is sensed.

In one implementation, the method may further include setting the offset to 0 when the number of passengers boarded the vehicle is 0.

In one implementation, the method may further include setting a distance from the boarded location of the passenger to a wheel without the vehicle height sensor as the offset.

In one implementation, the calculating of the mass change amount may include calculating the mass change amount by multiplying the load conversion factor by a value obtained by dividing the load by gravitational acceleration.

In one implementation, the method may further include determining the mass of the vehicle as a sum of an initial mass of the vehicle and the mass change amount.

In one implementation, the method may further include transmitting the calculated mass change amount to a control system of the vehicle to control an operation of the vehicle.

In one implementation, a non-transitory computer-readable medium may store computer-executable instructions, when executed by a processor, causing the processor to perform the above method.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
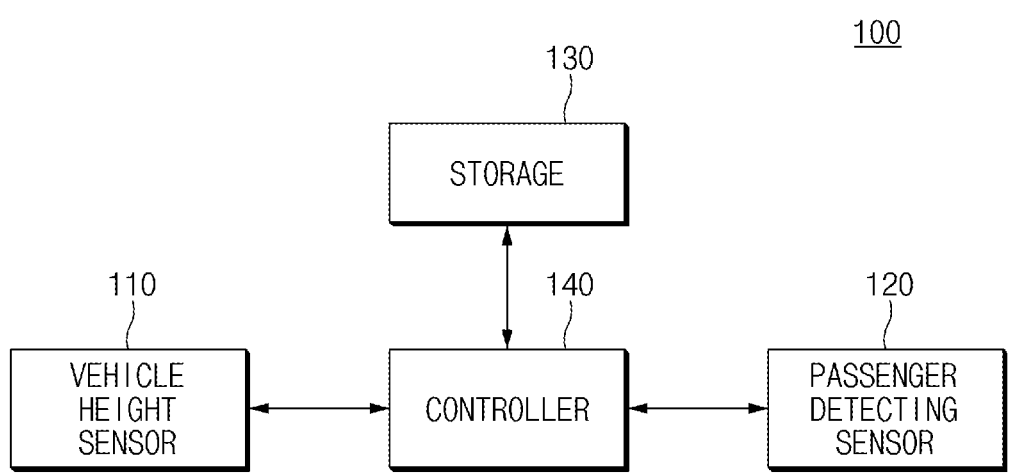
FIG. 1 is a configuration diagram illustrating a configuration of a vehicle mass determination device according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a configuration diagram illustrating a configuration of a vehicle mass determination device according to an embodiment of the present disclosure.

As shown in FIG. 1, a vehicle mass determination device 100 may include a vehicle height sensor 110, a passenger detecting sensor 120, a storage 130 and a controller 140.

Each vehicle height sensor 110 may be mounted on each of a left or right front wheel and a left or right rear wheel to sense a vehicle height of a vehicle. Each vehicle height sensor 110 may be generally mounted on each of four wheels (the left front wheel, the right front wheel, the left rear wheel, and the left rear wheel) of the vehicle. However, according to an embodiment of the present disclosure, each vehicle height sensor 110 may be mounted only on each of two left or right wheels (the left front wheel and the left rear wheel or the right front wheel and the right rear wheel). The vehicle height sensor 110 may sense a relative distance between a vehicle body and an axle as a vehicle height, and may sense the vehicle height in a general scheme in which two rotating levers are respectively mounted on the vehicle body and the axle and relative angles of the two levers with respect to a linear displacement are detected to sense the distance.

The passenger detecting sensor 120 may sense the number of passengers boarded the vehicle and locations of the passengers. The passenger detecting sensor 120 may sense a weight of the passenger seated in a seat. To this end, the passenger detecting sensor 120 may be implemented as a weight sensor. In addition, the passenger detecting sensor 120 may sense a location of a passenger's head to sense the boarded location of the passenger. To this end, the passenger detecting sensor 120 may be implemented as an image sensor.

The storage 130 may store each offset set based on the boarded location of each passenger according to an embodiment of the present disclosure, and may store a stiffness of a spring of a suspension of each wheel. The storage 130 may store at least one algorithm executed by the controller 140 to perform operation or execution of various instructions for an operation of the vehicle mass determination device 100 according to an embodiment of the present disclosure. The storage 130 may include at least one storage medium of a flash memory, a hard disc, a memory card, a read-only memory (ROM), a random access memory (RAM), an electrically erasable programmable read-only memory (EEPROM), a programmable read-only memory (PROM), a magnetic memory, a magnetic disk, or an optical disk.

The controller 140 may be implemented by various processing devices, such as a microprocessor embedded with a semiconductor chip capable of performing the operation or the execution of the various instructions. The controller 140 may control overall operations of the vehicle mass determination device according to an embodiment of the present disclosure based on the at least one algorithm stored in the storage 130. Specifically, the controller 140 may calculate a load based on the vehicle height sensed by the vehicle height sensor 110, calculate a load conversion factor based on the offset set based on the boarded location of the passenger and the number of passengers, and calculate a mass change amount based on load and the load conversion factor.

More specifically, the controller 140 may convert the vehicle height sensed by the vehicle height sensor 110 to a stroke value of the suspension. In this connection, the stroke may mean a motion or a distance that a piston moves from one side to the other side of a cylinder. According to an embodiment, the controller 140 may convert a moved distance of the piston based on a change in the vehicle height to the stroke value.

The controller 140 may perform the conversion to the stroke value based on a vehicle height sensed in a state in which the passenger is boarded the vehicle and may perform the conversion to the stroke value based on a vehicle height sensed in a state in which the passenger is not boarded the vehicle. The controller 140 may calculate a load of the wheel equipped with the vehicle height sensor 110 based on the stroke value converted based on the vehicle height and the stiffness of the suspension spring. In this connection, the stiffness may mean a degree of resistance to deformation of a material during elastic deformation, and stiffness information may be stored in the storage 130.

In addition, the controller 140 may calculate the load conversion factor by dividing a product of the number of passengers boarded the vehicle and a distance between the left and right wheels by a sum of the offsets set based on the boarded locations of the passengers. The controller 140 may set the offset to 0 when there is no passenger boarded the vehicle.

The controller 140 may calculate the mass change amount by multiplying the load conversion factor by a value obtained by dividing the load of the wheel equipped with the vehicle height sensor 110 by gravitational acceleration, and determine the mass of the vehicle as a sum of an initial mass of the vehicle and the mass change amount. In this connection, the initial mass of the vehicle may mean a mass of the vehicle in the state in which the passenger is not boarded the vehicle. In addition, the controller 140 may transmit the determination result to a control system (for example, an electronic stability control (ESC)), an active roll stabilization (ARS), a continuous damping control (CDC), and the like, thereby providing more accurate vehicle mass information. An operation of determining the mass of the vehicle according to an embodiment of the present disclosure will be described in more detail with reference to FIGS. 2 to 4.

Figure 2:
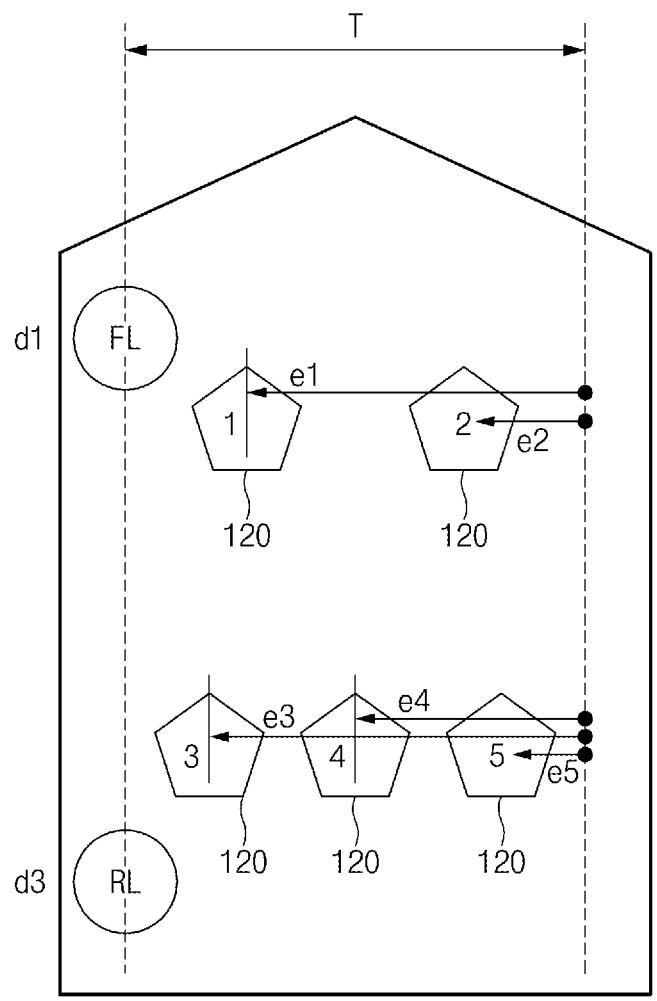
FIG. 2 is a diagram schematically illustrating parameters for calculating a mass change amount based on passenger boarding according to an embodiment of the present disclosure.

FIG. 2 is a diagram schematically illustrating parameters for calculating a mass change amount based on passenger boarding according to an embodiment of the present disclosure.

As shown in FIG. 2, the controller 140 may convert a vehicle height of the left front wheel FL equipped with the vehicle height sensor 110 to the stroke value of the suspension. When referring the stroke value converted based on the vehicle height sensed in the state in which the passenger is boarded the vehicle as $d_1$, referring the stroke value converted based on the vehicle height sensed in the state in which the passenger is not boarded the vehicle as $d_1^0$, and referring a stiffness of the left front wheel FL as $K_1$ according to an embodiment of the present disclosure, a load $\Delta F_1$ applied to the left front wheel FL may be calculated through Calculation formula 1.

$$\Delta F_1 = K_1(d_1 - d_1^0) \qquad \text{<Calculation formula 1>}$$

In addition, the controller 140 may convert a vehicle height of the left rear wheel RL equipped with the vehicle height sensor 110 to the stroke value of the suspension. When referring the stroke value converted based on the vehicle height sensed in the state in which the passenger is boarded the vehicle as $d_3$, referring the stroke value converted based on the vehicle height sensed in the state in which the passenger is not boarded the vehicle as $d_3^0$, and referring a stiffness of the left rear wheel RL as $K_3$ according to the embodiment of the present disclosure, a load $\Delta F_3$ applied to the left rear wheel RL may be calculated through Calculation formula 2.

$$\Delta F_3 = K_3(d_3 - d_3^0) \qquad \text{<Calculation formula 2>}$$

The controller 140 may calculate a load conversion factor ω using Calculation formula 3 based on the number of passengers boarded the vehicle n, a distance T between the left and right wheels, and the sum of the offsets set based on the boarded locations of the passengers. In this connection, the offset set based on the boarded location may mean a distance from a center of gravity of the passenger to a wheel (the right front wheel or the right rear wheel) that is not equipped with the vehicle height sensor 110. That is, when referring a distance from a center of gravity of a passenger at a boarded location 1 to the right front wheel as e1, referring a distance from a center of gravity of a passenger at a boarded location 2 to the right front wheel as e2, referring a distance from a center of gravity of a passenger at a boarded location 3 to the right rear wheel as e3, referring a distance from a center of gravity of a passenger at a boarded location 4 to the right rear wheel as e4, and referring a distance from a center of gravity of a passenger at a boarded location 5 to the right rear wheel as e5, the controller 140 may set the offsets based on the boarded locations as e1, e2, e3, e4, and e5. The controller 140 may set the offset to 0 when there is no passenger boarded the vehicle.

$$\omega = nT/(e1+e2+e3+e4+e5) \qquad \text{<Calculation formula 3>}$$

The controller 140 may calculate a mass change amount $\Delta m$ using Calculation formula 4 based on the loads $\Delta F_1$ and $\Delta F_3$ of the respective wheels equipped with the vehicle height sensors 110, a gravitational acceleration g, and the load conversion factor ω.

$$\Delta m = (\Delta F_1 + \Delta F_3)/g*\omega \qquad \text{<Calculation formula 4>}$$

In addition, the controller 140 may determine a mass m of the vehicle as a sum of an initial mass $m_0$ of the vehicle and the mass change amount $\Delta m$.

Figure 3:
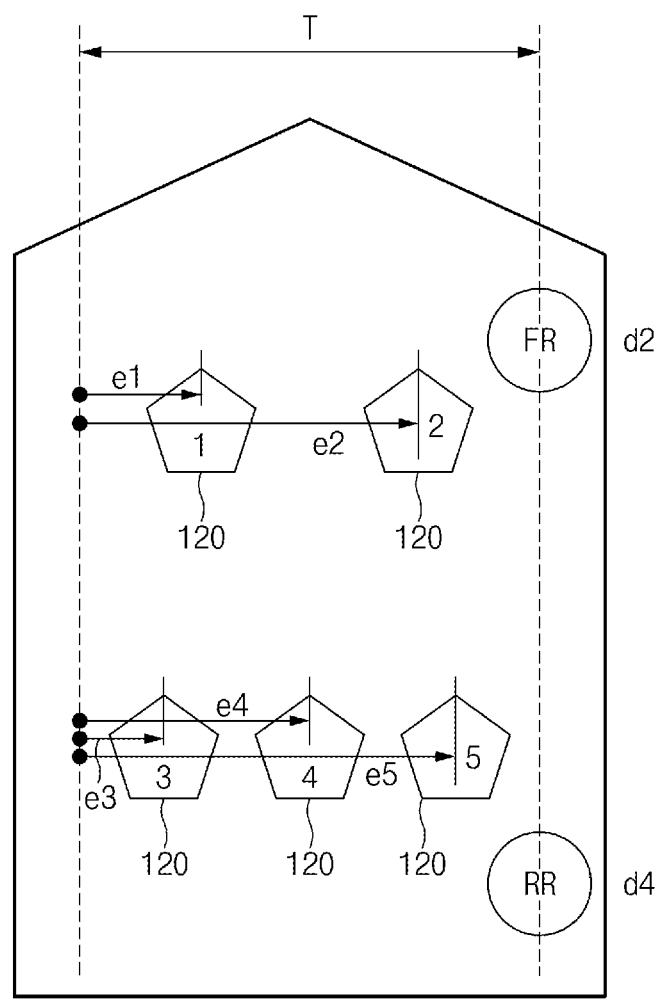
FIG. 3 is a diagram schematically illustrating parameters for calculating a mass change amount based on passenger boarding according to another embodiment of the present disclosure.

FIG. 3 is a diagram schematically illustrating parameters for calculating a mass change amount based on passenger boarding according to another embodiment of the present disclosure.

As shown in FIG. 3, the controller 140 may convert a vehicle height of the right front wheel FR equipped with the vehicle height sensor 110 to the stroke value of the suspension. When referring the stroke value converted based on the vehicle height sensed in the state in which the passenger is boarded the vehicle as $d_2$, referring the stroke value converted based on the vehicle height sensed in the state in which the passenger is not boarded the vehicle as $d_2^0$, and referring a stiffness of the right front wheel FR as $K_2$ according to the embodiment of the present disclosure, a load $\Delta F_2$ applied to the right front wheel FR may be calculated through Calculation formula 5.

$$\Delta F_2 = K_2(d_2 - d_2^0) \qquad \text{<Calculation formula 5>}$$

In addition, the controller 140 may convert a vehicle height of the right rear wheel RR equipped with the vehicle height sensor 110 to the stroke value of the suspension. When referring the stroke value converted based on the vehicle height sensed in the state in which the passenger is boarded the vehicle as $d_4$, referring the stroke value converted based on the vehicle height sensed in the state in which the passenger is not boarded the vehicle as $d_4^0$, and referring a stiffness of the right rear wheel RR as $K_4$ according to the embodiment of the present disclosure, a load $\Delta F_4$ applied to the right rear wheel RR may be calculated through Calculation formula 6.

$$\Delta F_4 = K_4(d_4 - d_4^0) \qquad \text{<Calculation formula 6>}$$

The controller 140 may calculate the load conversion factor ω using Calculation formula 7 based on the number of passengers boarded the vehicle n, the distance T between the left and right wheels, and the sum of the offsets set based on the boarded locations of the passengers. In this connection, the offset set based on the boarded location may mean a distance from the center of gravity of the passenger to a wheel (the left front wheel or the left rear wheel) that is not equipped with the vehicle height sensor 110. That is, when referring a distance from the center of gravity of the passenger at the boarded location 1 to the left front wheel as e1, referring a distance from the center of gravity of the passenger at the boarded location 2 to the left front wheel as e2, referring a distance from the center of gravity of the passenger at the boarded location 3 to the left rear wheel as e3, referring a distance from the center of gravity of the passenger at the boarded location 4 to the left rear wheel as e4, and referring a distance from the center of gravity of the passenger at the boarded location 5 to the left rear wheel as e5, the controller 140 may set the offsets based on the boarded locations as e1, e2, e3, e4, and e5. The controller 140 may set the offset to 0 when there is no passenger boarded the vehicle.

$$\omega = nT/(e1+e2+e3+e4+e5) \qquad \text{<Calculation formula 7>}$$

The controller 140 may calculate the mass change amount $\Delta m$ using Calculation formula 8 based on the loads $\Delta F_2$ and $\Delta F_4$ of the wheels equipped with the vehicle height sensors 110, the gravitational acceleration g, and the load conversion factor co.

$$\Delta m = (\Delta F_2 + \Delta F_4)/g^*\omega \qquad \text{<Calculation formula 8>}$$

In addition, the controller 140 may determine the mass m of the vehicle as the sum of the initial mass $m_0$ of the vehicle and the mass change amount $\Delta m$.

Figure 4:
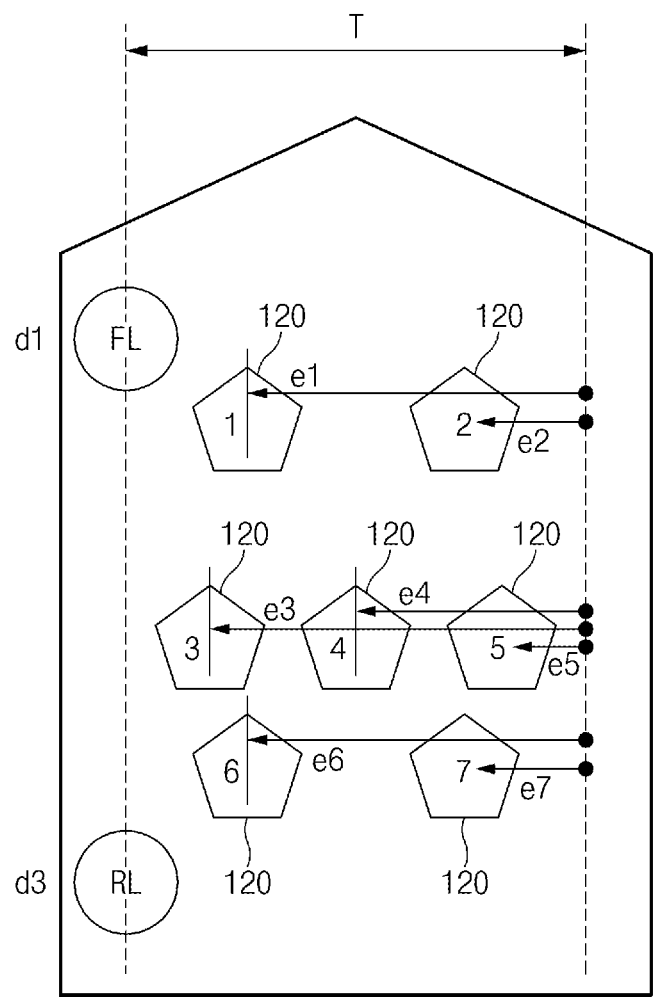
FIG. 4 is a diagram schematically illustrating parameters for calculating a mass change amount based on passenger boarding according to another embodiment of the present disclosure.

FIG. 4 is a diagram schematically illustrating parameters for calculating a mass change amount based on passenger boarding according to another embodiment of the present disclosure.

As shown in FIG. 4, the controller 140 may convert a vehicle height of the left front wheel FL equipped with the vehicle height sensor 110 to the stroke value of the suspension. When referring the stroke value converted based on the vehicle height sensed in the state in which the passenger is boarded the vehicle as $d_1$, referring the stroke value converted based on the vehicle height sensed in the state in which the passenger is not boarded the vehicle as $d_1^0$, and referring a stiffness of the left front wheel FL as $K_1$ according to the embodiment of the present disclosure, a load $\Delta F_1$ applied to the left front wheel FL may be calculated through Calculation formula 9.

$$\Delta F_1 = K_1(d_1 - d_1^0) \qquad \text{<Calculation formula 9>}$$

In addition, the controller 140 may convert a vehicle height of the left rear wheel RL equipped with the vehicle height sensor 110 to the stroke value of the suspension. When referring the stroke value converted based on the vehicle height sensed in the state in which the passenger is boarded the vehicle as $d_3$, referring the stroke value converted based on the vehicle height sensed in the state in which the passenger is not boarded the vehicle as $d_3^0$, and referring a stiffness of the left rear wheel RL as $K_3$ according to the embodiment of the present disclosure, a load $\Delta F_3$ applied to the left rear wheel RL may be calculated through Calculation formula 10.

$$\Delta F_3 = K_3(d_3 - d_3^0) \qquad \text{<Calculation formula 10>}$$

The controller 140 may calculate the load conversion factor co using Calculation formula 11 based on the number of passengers boarded the vehicle n, the distance T between the left and right wheels, and the sum of the offsets set based on the boarded locations of the passengers. In this connection, the offset set based on the boarded location may mean a distance from the center of gravity of the passenger to a wheel (the right front wheel or the right rear wheel) that is not equipped with the vehicle height sensor 110. That is, when referring a distance from the center of gravity of the passenger at the boarded location 1 to the right front wheel as e1, referring a distance from the center of gravity of the passenger at the boarded location 2 to the right front wheel as e2, referring a distance from the center of gravity of the passenger at the boarded location 3 to the right rear wheel as e3, referring a distance from the center of gravity of the passenger at the boarded location 4 to the right rear wheel as e4, referring a distance from the center of gravity of the passenger at the boarded location 5 to the right rear wheel as e5, referring a distance from a center of gravity of a passenger at a boarded location 6 to the right rear wheel as e6, and referring a distance from a center of gravity of a passenger at a boarded location 7 to the right rear wheel as e7, the controller 140 may set the offsets based on the boarded locations as e1, e2, e3, e4, e5, e6, and e7. The controller 140 may set the offset to 0 when there is no passenger boarded the vehicle.

$$\omega = nT/(e1+e2+e3+e4+e5+e6+e7) \qquad \text{<Calculation Formula 11>}$$

The controller 140 may calculate the mass change amount $\Delta m$ using Calculation formula 12 based on the loads $\Delta F_1$ and $\Delta F_3$ of the wheels equipped with the vehicle height sensors 110, the gravitational acceleration g, and the load conversion factor co.

$$\Delta m = (\Delta F_1 + \Delta F_3)/g^*\omega \qquad \text{<Calculation formula 12>}$$

In addition, the controller 140 may determine the mass m of the vehicle as the sum of the initial mass $m_0$ of the vehicle and the mass change amount $\Delta m$.

Figure 5:
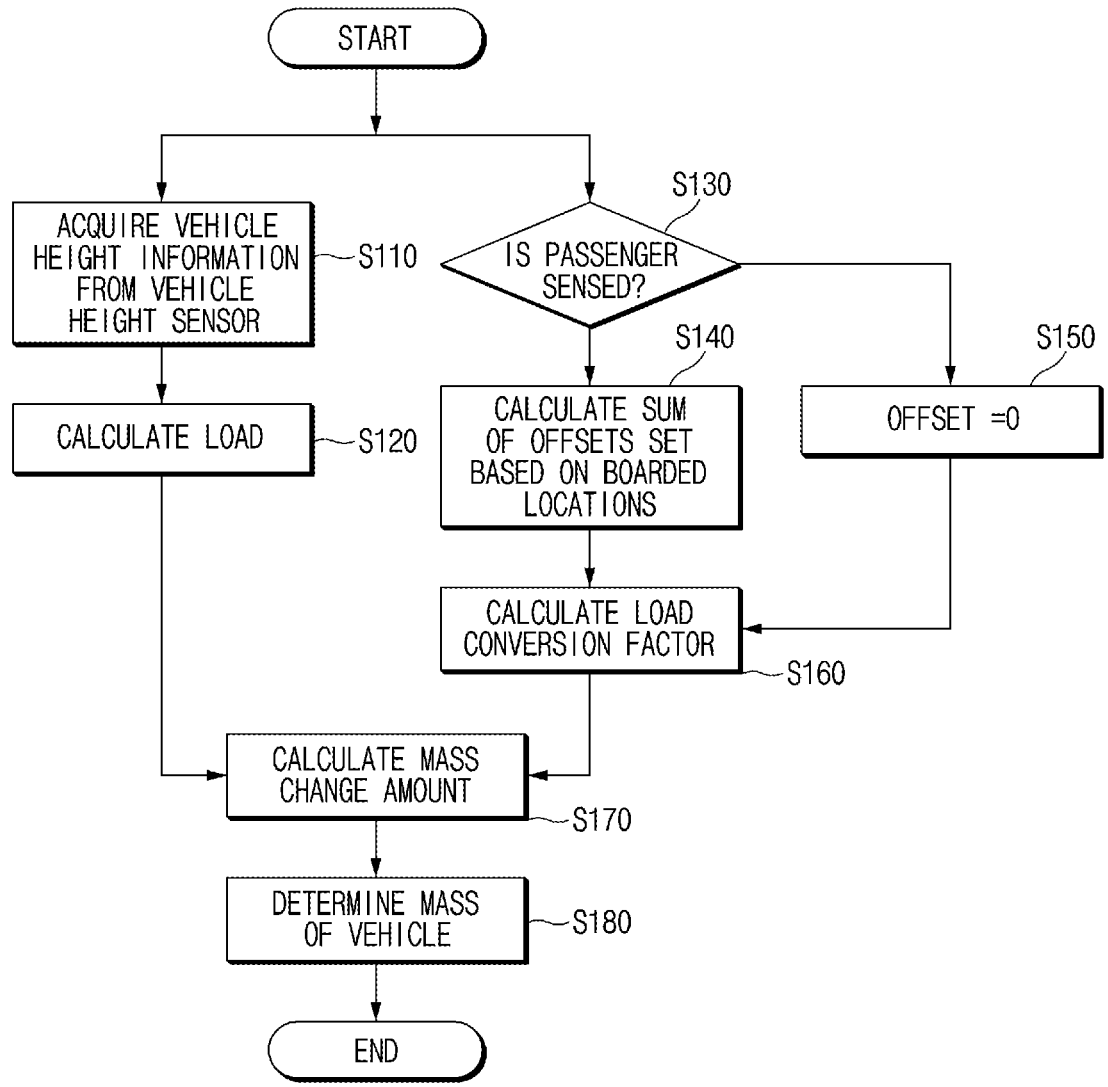
FIG. 5 is a flowchart illustrating a vehicle mass determination method according to an embodiment of the present disclosure.

FIG. 5 is a flowchart illustrating a vehicle mass determination method according to an embodiment of the present disclosure.

As shown in FIG. 5, the controller 140 may acquire vehicle height information sensed by the vehicle height sensor 110 (S110). In S110, the controller 140 may convert the vehicle height information to the stroke value of the suspension. In this connection, the stroke may mean the motion or the distance that the piston moves from one side to the other side of the cylinder. According to an embodiment, the controller 140 may convert the moved distance of the piston based on the change in the vehicle height to the stroke value. According to an embodiment, in S110, the controller 140 may perform the conversion to the stroke value based on the vehicle height sensed in the state in which the passenger is boarded the vehicle and may perform the conversion to the stroke value based on the vehicle height sensed in the state in which the passenger is not boarded the vehicle.

The controller 140 may calculate the load of the wheel equipped with the vehicle height sensor 110 based on the stroke value converted based on the vehicle height and the stiffness of the suspension spring (S120). In this connection, the stiffness may mean the degree of the resistance to the deformation of the material during the elastic deformation, and the stiffness information may be stored in the storage 130.

In addition, the controller 140 determines whether the passenger boarded the vehicle is sensed (S130). In S130, when determining that the passenger boarded the vehicle is sensed, the controller 140 may calculate the sum of the offsets set based on the boarded locations of the passengers (S140). In one example, when determining that there is no passenger boarded the vehicle, the controller 140 may set the offset to 0 (S150).

The controller 140 may calculate the load conversion factor by dividing the product of the number of passengers boarded the vehicle and the distance between the left and right wheels by the sum of the offsets calculated in S140 (S160).

The controller 140 may calculate the mass change amount by multiplying the load conversion factor by the value obtained by dividing the load of the wheel equipped with the vehicle height sensor 110 calculated in S120 by the gravitational acceleration (S170). The controller 180 may determine the mass of the vehicle as the sum of the initial mass of the vehicle and the mass change amount (S180). In addition, the controller 140 may transmit the determination result to the control system (for example, an electronic stability control (ESC)), the active roll stabilization (ARS), the continuous damping control (CDC), and the like, thereby providing the more accurate vehicle mass information.

Figure 6:
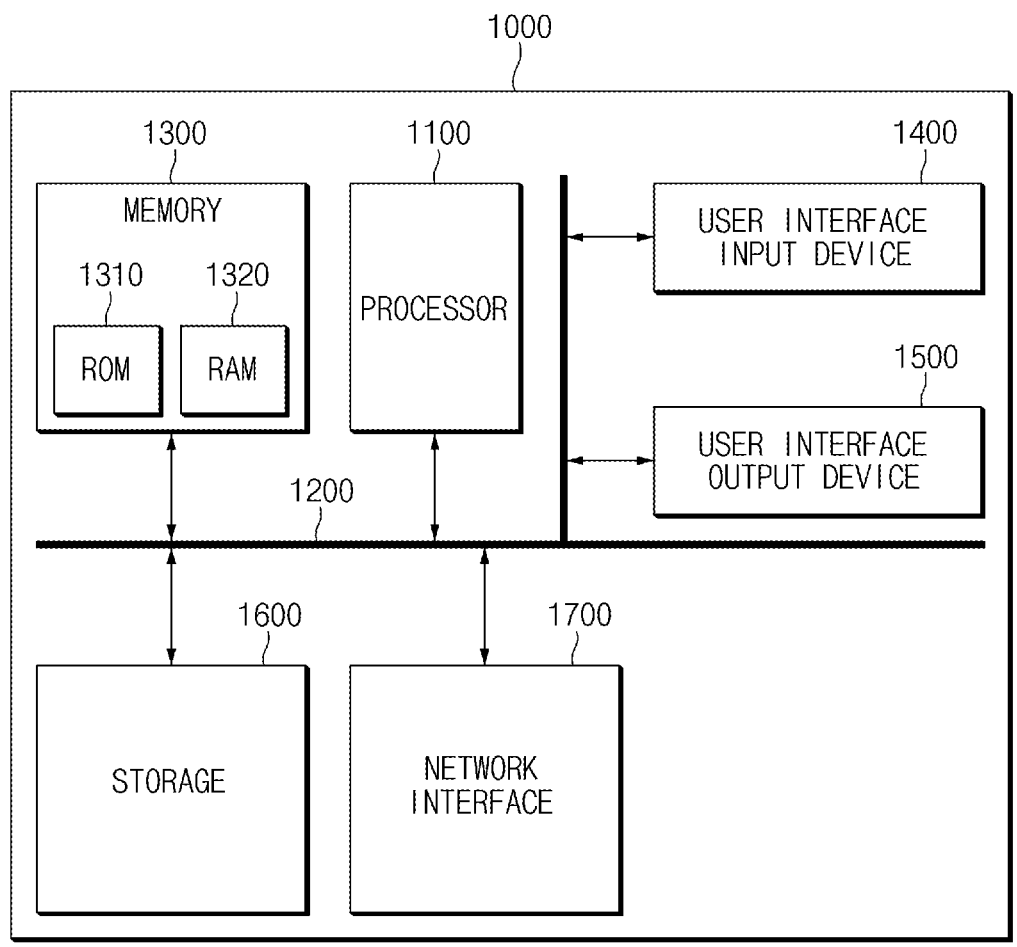
FIG. 6 illustrates a computing system in which a method according to an embodiment of the present disclosure is implemented.

FIG. 6 illustrates a computing system in which a method according to an embodiment of the present disclosure is implemented.

With reference to FIG. 6, a computing system 1000 may include at least one processor 1100, a memory 1300, a user interface input device 1400, a user interface output device 1500, a storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320. In one example, the controller 140 may include the processor 1100.

Thus, the operations of the method or the algorithm described in connection with the embodiments disclosed herein may be embodied directly in a hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device and the method for determining the mass of the vehicle according to an embodiment of the present disclosure may determine the accurate mass of the vehicle even when the vehicle height sensors are not mounted on all the four wheels, improve a performance of the vehicle by reflecting the determined mass of the vehicle to vehicle control, and reduce tuning parameters for the vehicle control.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for determining a mass of a vehicle, the device comprising:
    vehicle height sensors respectively mounted on a left front wheel and a left rear wheel of the vehicle or respectively mounted on a right front wheel and a right rear wheel of the vehicle to sense a vehicle height of the vehicle;
    a passenger detecting sensor for sensing the number of passengers boarded the vehicle and boarded locations of the passengers; and
    a controller configured to:
        calculate a load based on the vehicle height;
        calculate a load conversion factor based on each offset set based on a boarded location of each passenger and the number of passengers; and
        calculate a mass change amount based on the load and the load conversion factor.

2. The device of claim 1, wherein the controller is configured to convert the vehicle height to a stroke value of a suspension.

3. The device of claim 2, wherein the controller is configured to calculate a load of a wheel equipped with the vehicle height sensor based on the stroke value and a stiffness of a spring of the suspension.

4. The device of claim 1, wherein the controller is configured to calculate the load conversion factor by dividing a product of the number of passengers boarded the vehicle and a distance between left and right wheels by a sum of the offsets set based on the boarded locations of the passengers whose boarding is sensed.

5. The device of claim 4, wherein the controller is configured to set the offset to 0 when the number of passengers boarded the vehicle is 0.

6. The device of claim 4, wherein the controller is configured to set a distance from the boarded location of the passenger to a wheel without the vehicle height sensor as the offset.

7. The device of claim 1, wherein the controller is configured to calculate the mass change amount by multiplying the load conversion factor by a value obtained by dividing the load by gravitational acceleration.

8. The device of claim 1, wherein the controller is configured to determine the mass of the vehicle as a sum of an initial mass of the vehicle and the mass change amount.

9. The device of claim 1, wherein the controller is configured to transmit the calculated mass change amount to a control system of the vehicle to control an operation of the vehicle.

10. A method for determining a mass of a vehicle, the method comprising:
- obtaining a vehicle height of the vehicle sensed by vehicle height sensors respectively mounted on a left front wheel and a left rear wheel of the vehicle or respectively mounted on a right front wheel and a right rear wheel of the vehicle;
- sensing the number of passengers boarded the vehicle and boarded locations of the passengers;
- calculating a load based on the vehicle height;
- calculating a load conversion factor based on each offset set based on a boarded location of each passenger and the number of passengers; and
- calculating a mass change amount based on the load and the load conversion factor.

11. The method of claim 10, further comprising:
- after the obtaining of the vehicle height,
- converting the vehicle height to a stroke value of a suspension.

12. The method of claim 11, wherein the calculating of the load includes calculating a load of a wheel equipped with the vehicle height sensor based on the stroke value and a stiffness of a spring of the suspension.

13. The method of claim 10, wherein the calculating of the load conversion factor includes calculating the load conversion factor by dividing a product of the number of passengers boarded the vehicle and a distance between left and right wheels by a sum of the offsets set based on the boarded locations of the passengers whose boarding is sensed.

14. The method of claim 13, further comprising:
- setting the offset to 0 when the number of passengers boarded the vehicle is 0.

15. The method of claim 13, further comprising:
- setting a distance from the boarded location of the passenger to a wheel without the vehicle height sensor as the offset.

16. The method of claim 10, wherein the calculating of the mass change amount includes calculating the mass change amount by multiplying the load conversion factor by a value obtained by dividing the load by gravitational acceleration.

17. The method of claim 10, further comprising:
- determining the mass of the vehicle as a sum of an initial mass of the vehicle and the mass change amount.

18. The method of claim 10, further comprising:
- transmitting the calculated mass change amount to a control system of the vehicle to control an operation of the vehicle.

19. A non-transitory computer-readable medium storing computer-executable instructions, when executed by a processor, causing the processor to perform the method of claim 10.

* * * * *